United States Patent [19]

Mehnert

[11] Patent Number: 4,685,043

[45] Date of Patent: Aug. 4, 1987

[54] INVERTER FOR GENERATING A STAIRCASE-SHAPED A.C. VOLTAGE ON EACH OF THE PHASE CONDUCTORS OF A MULTIPHASE SYSTEM

[75] Inventor: Walter Mehnert, Ottobrunn, Fed. Rep. of Germany

[73] Assignee: MITEC Moderne Industrietechnik GmbH, Ottobrunn, Fed. Rep. of Germany

[21] Appl. No.: 724,213

[22] Filed: Apr. 17, 1985

[30] Foreign Application Priority Data

Apr. 21, 1984 [DE] Fed. Rep. of Germany ....... 3415145

[51] Int. Cl.⁴ ........................ H02M 1/12; H02M 7/44
[52] U.S. Cl. .......................................... 363/43; 307/66
[58] Field of Search ..................... 307/66; 363/43, 132

[56] References Cited

U.S. PATENT DOCUMENTS 3,391,323  7/1968  Ikeda ...................................... 363/43
4,467,407  8/1984  Asano et al. ........................... 363/43

FOREIGN PATENT DOCUMENTS

571257 12/1957 Italy ....................................... 363/43
197707  7/1977 U.S.S.R. ............................... 363/43

*Primary Examiner*—William H. Beha, Jr.
*Attorney, Agent, or Firm*—Sughrue, Mion, Zinn, Macpeak, and Seas

[57] ABSTRACT

In an inverter for the generation of the voltages of a multi-phase system, connections between each phase conductor and the output terminals of a d.c. power supply are closed and opened by means of controllable switches. The zero voltage, the crest voltage and at least one intermediate voltage laying between these voltages are tappable at the d.c. power supply; for the staircase-shaped approximation of a sine half wave, each phase conductor is connected to the zero voltage for a first time span, to the intermediate voltage for an immediately following second time span, thereafter to the crest voltage for a fourth time span, thereafter to the first intermediate voltage for a sixth time span and to the zero voltage for an immediately following seventh time span, this sequence being repeated with alternating voltage signs; in order that no damaging countercurrents flow into the direct voltage source arrangement in the case of a phase displacement between current and voltage occurring by reason of a capacitive or inductive loading, two phase conductors are connected at the same time during the second and the sixth time span to the output terminal delivering the first intermediate voltage.

17 Claims, 7 Drawing Figures

INVERTER FOR GENERATING A STAIRCASE-SHAPED A.C. VOLTAGE ON EACH OF THE PHASE CONDUCTORS OF A MULTIPHASE SYSTEM

FIELD OF INVENTION

The invention concerns an inverter, for generating on each of the phase conductors of a multiphase system, a staircase-shaped voltage approximating a sinusoidal a.c. voltage by periodically closing and opening controllable switches which are arranged for connecting and disconnecting the phase conductors with or from the output terminals of a d.c. power supply, at which output terminals different d.c. voltages are available.

BACKGROUND OF THE INVENTION

Inverters of that kind are used for example as independent current supplies for electrical loads which need a multiphase current, particularly a three-phase current, when no appropriate mains are at disposal. Such inverter further comprise a control unit which has a free-running time base, from which the switching command signals for the controllable switches are so derived that the different phase conductors are, for the production of an alternating voltage at the desired frequency of for example 50 Hertz or 60 Hertz, periodically connected with the different output terminals of the d.c. power supply and again separated from these.

Another possibility for use is by employment as emergency current unit which shall take over the supply of a load when the mains, which normally stand at disposal, fail and are no longer capable of delivering the required multiphase current. In that case, the above-mentioned time base initially does not run freely, but is so synchronized with the mains voltage, which is sensed by way of sensors, that the emergency current unit can take over the supply of the load as free from interruption as possible in the case of a mains failure. After failure of the mains, the time base must also here run on automatically and take care of the correct frequency and phase position of the produced voltages.

It is known for these cases of application to use as a d.c. power supply for example a battery block which in principle has only two terminals, at which the maximum crest voltage, for example 310 volts, can be taken off. The individual phase conductors are applied with the aid of thyristors to those 310 volts with alternating polarity in the required timing cycle and again separated so that, in place of a sinusoidal wave, a rectangular pulse train arises, which in case of need can be rounded off and assimilated to a sinusoidal course by choke elements, filter members or transformers. A particular problem arises in such an inverter when it is used for the supply of a not purely ohmic load and it comes to a phase displacement between current and voltage on the phase conductors by reason of inductive or capacitive loading. In such a case, during each period, time intervals occur, in which current and voltage possess opposite signs so that a current in opposite direction, thus a charging current in the case of batteries, flows through the direct voltage sources. This short period alternation between charging and discharging currents is damaging particularly for batteries and leads not only to high heat losses, but also shortens the operating life appreciably. It is therefore known to equip inverters with a plurality of coils and/or capacitors and to switch these elements in or out, in dependence on whether the load becomes capacitive or inductive in increasing or decreasing degree, in order to compensate for the phase displacement between current and voltage caused by the load.

Such arrangements are extraordinarily expensive in material and costs, have a great space requirement and are liable to faults.

An objective of the invention is to provide an inverter of the initially described kind in which phase displacements between current and voltage remain without damaging effects for the direct voltage sources for at least as long as these phase displacements do not exceed a maximum permissible phase angle.

SUMMARY OF THE INVENTION

In practising the invention, a phase angle range is created around each zero transition of the ideal sinusoidal voltage course to be approximated, in which range a phase displacement between current and voltage can not act on the direct voltage sources and damage these. This protection or safety range is produced directly before and after each such zero transition thereby, that each of the phase conductors stands in connection with the zero potential during the time spans $t_7$ and $t_1$ so that no current can flow into the batteries. Both the time spans $t_7$ and $t_1$ follow one directly the other, i.e. the end point of $t_7$ coincides with the start point of $t_1$. At the same time, this instant corresponds to the zero transition of the ideal sinusoidal wave to be approximated. In the time span $t_6$, which immediately precedes the time span $t_7$, and in the time span $t_2$, which immediately follows the time span $t_1$, the respective phase conductor lies at a first intermediate voltage $U_{Z1}$, which preferably amounts to 50% of the crest voltage $U_S$. If one considers a positive half wave, then in the case of a correspondingly large phase displacement, for example, a current leading the voltage can during the entire time span $t_2$ possess negative values although the voltage is positive. During the time span $t_6$, thereagainst, current and voltage have the same sign for the same phase displacement, i.e. during a positive voltage half wave, the current is also positive and runs through values in the neighbourhood of its maximum. If one always applies two phase conductors simultaneously to the same output terminal of the d.c. power supply during the corresponding times, of which two phase conductors the one is just running through the time span $t_2$ and the other through the time span $t_6$, then the d.c. power supply is loaded only by the difference current of both the phase conductors, which in the present case is not negative, since the positive current of the phase conductor running through the time span $t_6$ is greater or at least equal to the negative current of the phase conductor which just runs through the time span $t_2$. Current and voltage thus likewise do not have different signs in these time spans and it can not come to an undesired countercurrent loading of the direct voltage sources although a phase displacement between current and voltage is present.

The same applies also for the negative half waves, except that the phase conductor running through the time span $t_2$ here delivers the current which is greater in magnitude. The corresponding applies also for a phase displacement, in which the current lags behind the voltage, except that here that phase conductor delivers the greater current for the positive half wave, which is just running through the time span $t_2$, and the phase conductor, which runs through the time span $t_6$, for the negative half wave.

Since the time spans $t_1$ and $t_2$ or $t_6$ and $t_7$ follow one directly the other, i.e. the end of the preceding time span $t_1$ or $t_6$ exactly co-incides with the start of the following time span $t_2$ or $t_7$ and, as already mentioned, the time span $t_1$ of each half wave directly follows the time span $t_7$ of the preceding half wave, a safety range or time span of the length $t_6+t_7+t_1+t_2$ is created, in which phase displacements between current and voltage can arise without damaging effect on the direct voltage sources, around each zero transition of the ideal sinusoidal wave. The magnitude of the maximum permissible phase displacement in this case depends on the length of this time interval.

In a preferred example of embodiment, in which the time span $t_1$ and $t_7$ each correspond to a phase angle of 15° and the time spans $t_2$ and $t_6$ each correspond to a phase angle of 30° for a three-phase current with an angular displacement of 120° between the phases, the safety time interval corresponds to a phase angle of 90° so that phase displacements of ±45° can be permitted without countercurrents flowing. Higher demands in respect of the maximum permissible phase displacements are as a rule not made on inverters.

For a multiphase system with more than three, for example with six phases which are each displaced through 60° one relative to the other, the safety time interval lets itself be increased still further thereby, that one a second intermediate voltage $U_{Z2}$ is provided, which lies between the first intermediate voltage $U_{Z1}$ and the crest voltage $U_S$, tappable at the d.c. power supply. During two further time spans $t_3$ and $t_5$, of which the first immediately follows the time span $t_2$ and the second immediately precedes the time span $t_6$, one applies the considered phase conductor again together with another phase conductor simultaneously to this second intermediate voltage $U_{Z2}$, for which it again applies that the one phase conductor is just running through the time span $t_3$ and the other phase conductor through the time span $t_5$. A compensating effect then again results between positive and negative currents and a countercurrent loading of the direct voltage source is avoided also for these time spans.

Both the further time spans $t_3$ and $t_5$ can preferably each correspond to a phase angle of 30° so that the safety time interval $t_5+t_6+t_7+t_1+t_2+t_3$, which is attainable altogether, corresponds to a phase angle of 150°; in this case, phase displacements between current and voltage of ±75° can thus be permitted without damaging influences on the direct voltage sources.

A substantial advantage of the inverter according to the invention compared with the state of the art consists in that it comprises, apart from the in any case necessary control unit, only the direct voltage sources and the controllable switches, i.e. it avoids the damaging effects of phase displacement between current and voltage in a large phase angle range without any kind of capacitors or coils having to be provided for this and switched in and out in dependence on the magnitude of the instantaneously arising phase displacement.

The length of the safety time interval of ±45° or ±75° is in that case no absolute magnitude, but can be varied through alteration of the length of the time spans $t_1$, $t_2$, $t_6$ and $t_7$ or $t_3$ and $t_5$. The limits of these possibilities of variation depend on the demands which are set on the accuracy, with which the staircase-shaped voltage curve produced with the aid of the controllable switches on each phase conductor shall approximate the ideal sinusoidal shape. For the case that increased demands are set in this respect, it is provided according to the invention also for a three-phase system that the time span $t_4$, in which the respective phase conductor lies at the crest voltage $U_S$, does not necessarily have to adjoin directly at the preceding time span $t_2$ and the following time span $t_6$. Preferably, the voltage source arrangement is also here so constructed that a second intermediate voltage $U_{Z2}$ is tappable from it, which lies between the first intermediate voltage $U_{Z1}$ and the crest voltage $U_S$. Between the time spans $t_2$ and $t_4$ or the time spans $t_4$ and $t_6$, a time span $t_3$ or $t_5$ can then likewise be inserted, during which the phase conductor is each time applied on its own to the second intermediate voltage $U_{Z2}$. Thereby, due to the increased number of voltages to be tapped, an increased number of staircase steps and thus a lower harmonic component results particularly in the region of a half wave, in which the ideal sinusoidal shape to be approximated extends very flatly in the neighbourhood of the maximum. In this respect, the comparatively high voltage step on the transition from the time span $t_1$ to the time span $t_2$ and from $t_6$ after $t_7$ is uncritical, because there transitions lie in the proximity of the zero transition of the ideal sinusoidal curve, i.e. in its steepest region.

Within the scope of the invention, it is in case of need quite possible for a three-phase system as well as also a multiphase system of higher order to provide a third intermediate voltage $U_{Z3}$, which for example lies between the second intermediate voltage $U_{Z2}$ and the crest voltage $U_S$, and to connect the phase conductors with this third intermediate voltage $U_{Z3}$ during corresponding, additionally inserted time spans $t_8$ and $t_9$.

In the cases, in which only two intermediate voltages shall be tapped off, it is possible according to the invention to manage with only four direct voltage source units, which are connected in series in like sense one with the other and of which two each time deliver the same voltage and which are so arranged symmetrically to the centre of the series connection that the first intermediate voltage $U_{Z1}$ is tappable at both the outer units, whilst a voltage drops across both inner units, which on addition to the first intermediate voltage $U_{Z1}$ results in the second intermediate voltage $U_{Z2}$. In order in such an arrangement also to be able to tap off the crest voltage $U_S$, the zero potential of the series connection is according to the invention displaced upwardly or downwardly from the centre for certain time spans. This is still described more exactly in the following.

It is here of importance that in this arrangement, which distinguishes itself by a very uniform current loading of the individual units, the voltages of the units can no longer be chosen one independently of the other. Rather, the condition $2 U_{Z2} = U_S + U_{Z1}$ must be fulfilled. If one now choses $U_{Z1} = \frac{1}{2} U_S$, which for the time spans $t_2$ and $t_6$, during which $U_{Z1}$ is applied to the respective phase conductors, exactly corresponds to the corresponding value of the ideal sinusoidal shape, then a value of 75% of the crest voltage $U_S$ results for $U_{Z2}$. The time spans $t_3$ and $t_5$, at which $U_{Z2}$ is applied to the respective phase conductor, lie in a time range, in which the ideal sinusoidal shape passes through the phase angle 60°; here, the voltage should thus amount to 86.6% of the crest voltage $U_S$. The 75% value for $U_{Z2}$, as it results in the above arrangement for $U_{Z1} = \frac{1}{2}U_S$, deviates appreciably therefrom. If one wants to come to a better approximation here, $U_{Z1}$ can be chosen to be somewhat higher than 50% of $U_S$, for example equal to 56% of $U_S$, from which a value of 78% of $U_S$ then results for $U_{Z2}$. In dependence on the demands in respect of the power contained in the harmonics, an optimisation of the staircase-shaped approximation to the ideal sinusoidal course lets itself be attained each time through variation of the parameters (number and length of the time spans, number and absolute values of the tappable voltage) standing at disposal to such a strong extent that less than 5%, typically only about 2% of the power delivered by the d.c. power supply lies in the harmonic region. Hereby, even when one provides active filter or throttle members for the further smoothing, the power losses arising hereby are kept extraordinarily small, because a very small part of the total power needs to be influenced by these additional circuits.

A further advantage, which results from the staircase-shaped approximation of the ideal sinusoidal course, consists in that the inverter according to the invention on its use as emergency current unit can take over the supply of the load practically free of interruption, i.e. with a voltage value which comes very near to the instantaneous voltage value last delivered from the mains.

In the preceding considerations, only one half wave has always been considered, which was covered by the time spans $t_1$ to $t_7$ (or further time spans). The same applies also for the half waves which respectively precede and follow this half wave and possess the sign which is opposite to that of the half wave considered. They can be produced either thereby, that the d.c. power supply possesses a positive and a negative output terminal for each voltage value, wherein these output terminals then lie symmetrically to the zero potential, or voltage output terminals of only one polarity with respect to the zero potential can be provided, from which output terminals the positive and negative half waves are then produced with the aid of pole-changers.

Particularly preferred embodiments of the d.c. power supply possess different terminals for positive and negative voltage values, but the zero potential yet does here not lie fixedly in the centre. Rather, it wanders in the different time spans $t_1$ to $t_7$ or $t_1$ to $t_9$ to and fro between some of the output terminals, which has the consequence that on the use of a star point conductor, this can with the aid of its own set of switches likewise be applied to different output terminals of the d.c. power supply. From this, the advantage results for the embodiment, which consists of four units fixedly connected one with the other, of an extremely uniform current loading of the four units, which loading fluctuates only between 75% and 100% of the nominal current in the case of a purely ohmic load. Although these fluctuations become greater in the case of a capacitive or inductive load, it yet does not arise that individual units are periodically switched off completely, for example for the duration of one of the time spans $t_1$ to $t_7$. On the one hand, this has the consequence of a high efficiency which is particularly important when solar cells are employed as voltage sources. Beyond that, the advantage results on the use of batteries that these do not have to be switched on and off at high frequency, which would lead to a heating by reason of internal losses and shorten the operating life.

If, for example, two units, which lie directly symmetrically to the centre point of the series connection and are connected with this, are still added according to another modification to the four units of this embodiment, then both these additional units must be switched individually or together out of or into the series connection for certain time spans by the switches controlled by the control unit. This means that both these units do not experience the same advantageous uniform current loading as the four outer units, but further staircase steps let themselves be inserted with their aid and make possible a still smoother approximation to the ideal sinusoidal shape.

Futhermore, no pole-charger is required in this preferred embodiment of the d.c. power supply. Merely twelve or fourteen switches are needed for the switching of the three phase conductors of a three-phase rotary current system and of the one star point conductor.

BRIEF DESCRIPTION OF THE DRAWING

The invention is described in the following with the aid of examples of embodiment with reference to the drawing; in this, there show:

FIG. 1 the schematic block diagram of a typical case of application for an inverter as emergency current unit, FIG. 2 a schematic illustration of the inverter according to the invention, FIG. 3 a sinusoidal voltage course on one of the phase conductors with the time spans used for its staircase-shaped approximation, FIG. 4 the temporal course of the connections of three phase conductors of a rotary current system with a d.c. power supply consisting of four units as well as the staircase-shaped approximation of the three phases resulting therefrom for the time duration of a half wave, FIG. 5 the ideal sinusoidal voltage course of the three phases of a rotary current system as well as the staircase-shaped approximation of one of these voltage courses and the current displaced in phase hereto for the time duration of a full wave, FIG. 6 the ideal sinusoidal voltage course for a six-phase system and FIG. 7 an illustration, corresponding to that of FIG. 4, for a direct voltage source arrangement consisting of six units.

DESCRIPTION OF PREFERRED EMBODIMENTS OF THE INVENTION

Figure 1:
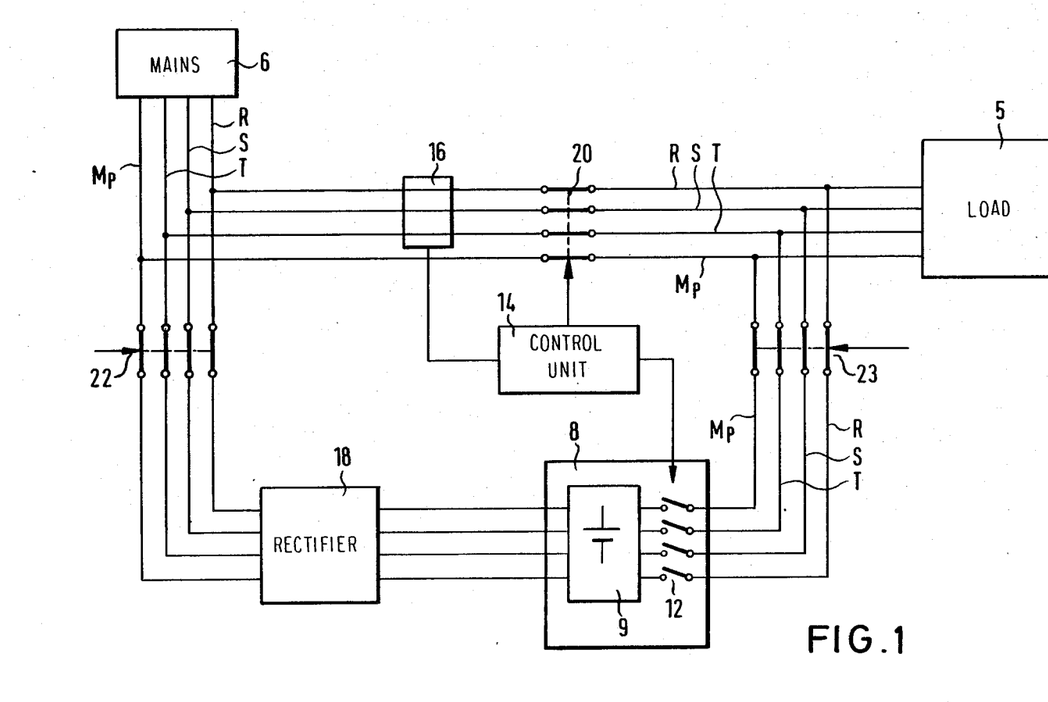

According to FIG. 1, a load 5 is supplied with electrical energy from a three-phase current system, the phase conductors R, S and T of which as well as the star point conductor Mp stand in connection with a mains 6, from which the three-phase system is normally fed.

In order to be able to continue to supply the load 5 with electrical energy also in the case of a failure of the mains 6, an inverter 8 is provided as emergency current unit and comprises a d.c. power supply 9 as well as controllable switches 12, with the aid of which the star point conductor Mp and the three phase conductors R, S and T, which connect the inverter 8 with the load 5, can be applied to the output terminals of the d.c. power supply 9 or be separated from this. The command signals for these, here only schematically indicated controllable switches 12 come from a control unit 14, which takes care that the alternating voltages on the phase conductors R, S and T possess an approximately sinusoidal course, the required frequency of for example 50 Hertz or 60 Hertz as well as the correct phase position, i.e. are in the case of a three-phase system each displaced through 120° one relative to the other. The control unit 14 receives input signals from a sensor unit 16, with the aid of which it is monitored whether the mains 6 operate unobjectionably and supply the needed electrical energy. As long as this is the case, the signals delivered by the sensor unit 16 are used merely to synchronise a time base running in the control unit 14 with the mains frequency. The controllable switches 12 remain permanently opened in this time interval so that the d.c. power supply 9 is not loaded. It can during this time be charged in the required manner with the aid of a rectifier 18, which in its turn is fed from the mains and can comprise a voltage regulator stabilising the mains voltage.

When the signals delivered by the sensor unit 16 indicate that the mains are failing, the control circuit 14 frees the command signals for the controllable switches 12 so that these start without interruption, i.e. with the same phase position and with about the same instantaneous voltage values, so to connect the phase conductors R, S and T with the output terminals of the d.c. power supply 9 that the energy supply of the load 5 is continued to be secured. At the same time, the control circuit 14 opens the controllable switches 20 in order to prevent that parts of the electrical power delivered by the inverter 8 is fed into the mains 6 or used by the rectifier 18 for the charging-up of the d.c. power supply 9.

Isolating switches 22 or 23, which are for example manually actuable and with the aid of which the emergency current unit can be separated from the mains or from the load for maintenance operations or the like, are respectively provided in the connecting lines which lead from the mains 6 to the rectifier 18 and from the inverter 8 to the load 5. In FIG. 1, these isolating switches just as the controllable switches 20 are closed; thus, the operational state is illustrated here, in which the mains 6 supply the load 5 with electrical energy, whilst the inverter 8 is in a state of readiness.

Figure 2:
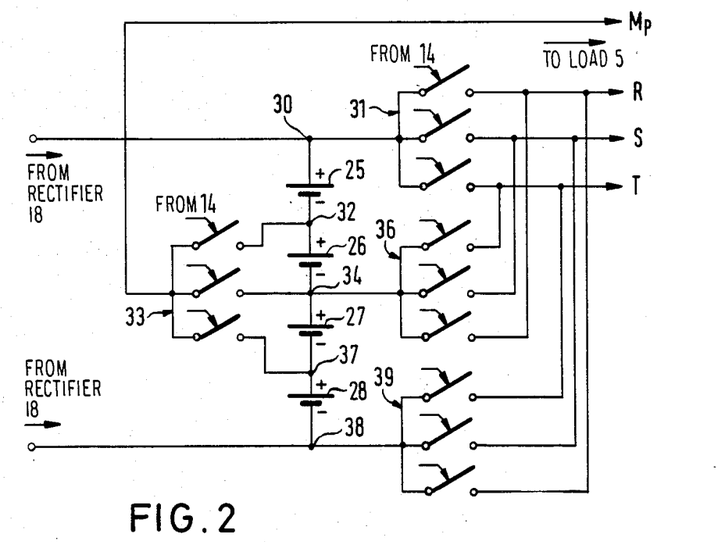

In FIG. 2, the build-up of the inverter 8 according to the invention is illustrated more exactly. One sees that the d.c. power supply 9 consists of four battery blocks 25, 26, 27 and 28 which are connected one with the other in like sense, i.e. so in series that the negative terminal of the one battery block is connected each time with the positive terminal of the adjacent battery block. Lying at that end of the series connection, which is at the top in FIG. 2, is the battery block 25, the positive terminal of which forms the positive end output terminal 30 of the d.c. power supply 9, which output terminal is connected on the one hand with the rectifier 18 and on the other hand with a first group 31 of controllable switches, with the aid of which the positive end output terminal 30 can be connected with the phase conductors R, S and T leading to the load 5.

The negative terminal of the battery block 25 is connected with the positive terminal of the battery block 26 and this connection is connected with a positive intermediate output terminal 32 of the d.c. power supply 9, with which the star point conductor Mp can be connected through a controllable switch of a third group 33.

The negative terminal of the battery block 26 is connected with the positive terminal of the battery block 27 and this connection is connected with the centre point output terminal 34 of the d.c. power supply 9, which is connectible on the one hand by way of a third group 36 of controllable switches with the phase conductors R, S and T leading to the load and, on the other hand, by way of a switch of the second group 33 with the star point conductor Mp.

The negative terminal of the battery block 27 is connected with the positive terminal of the battery block 28 and this connection is connected with a negative intermediate output terminal 37 of the d.c. power supply 9, which is connectible by way of a controllable switch of the second group 33 with the star point conductor Mp.

The negative terminal of the battery block 28, which lies at the other end of the series connection, forms the negative end output terminal 38, which is connected on the one hand with the rectifier 18 and on the other hand with a fourth group 39 of controllable switches, by way of which it can be connected with the phase conductors R, S and T.

It is indicated symbolically by the bent arrows that controllable switches, which receive their command signals from the control unit 14, are concerned in the case of the switches of the groups 31, 33, 36 and 39. Standing at disposal for this case of application are very rapid semiconductor switches, for example power-MOS switches, of which several can also be operated in parallel one with the other for the switching of higher loads. This is not further illustrated in FIG. 2, i.e. that the switches shown in FIG. 2 can all be driven independently one of the other, as is still described more exactly further below.

Figure 3:
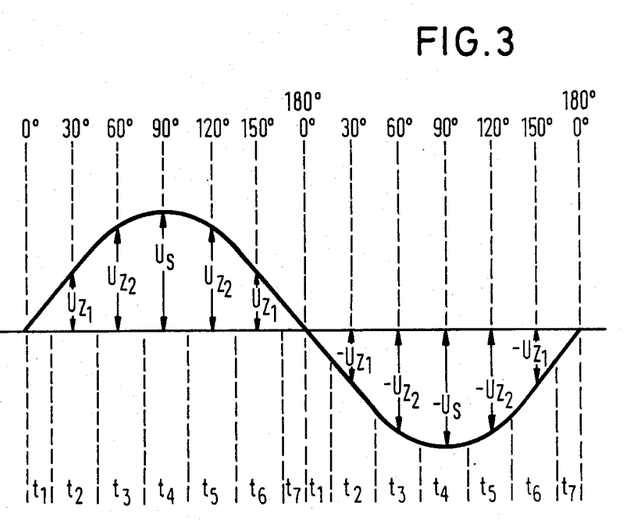

FIG. 3 shows a full sine wave as it shall be repeated on each of the phase conductors in time displacement one from the other, approximated and periodically at the frequency of the alternating current to be produced.

For this purpose, the control unit 14 predetermines for each half wave, for example, seven time spans $t_1$ to $t_7$, during which the phase conductor concerned is corrected with the aid of the controllable switches with different output terminals, each delivering a suitable voltage, of the d.c. power supply 9. Although the ideal sinusoidal shape illustrated in FIG. 3 is approximated only in staircase-shape, yet reference is taken for the sake of greater clarity to the zero transitions and phase angles of this ideal sine curve, wherein for the purposes of this explanation, the counting of the phase angle on each zero transition again begins from the front, thus runs only up to 180°.

The first time span $t_1$, during which the phase conductor concerned is applied to the zero voltage, starts with the zero transition leading to the positive half wave at the extreme left in FIG. 3. This first time span $t_1$ has a length which corresponds to a phase angle of 15°. During the time span $t_2$, which follows directly on the time span $t_1$ and the length of which corresponds to a phase angle of 30°, the phase conductor is applied to a first intermediate voltage $U_{Z1}$, which for example amounts to 50% of the crest voltage $U_S$; the ideal sinusoidal curve passes through this value at a phase angle of 30°, to which the time span $t_2$ lies symmetrically. During a later following time span $t_4$, the length of which corresponds to a phase angle of 30°, the phase conductor is appplied to the crest voltage $U_S$, which takes into account the fact that the ideal sinusoidal wave runs through this crest voltage $U_S$ at the phase angle of 90° in the middle of this time span. In the further course, the sine wave at the phase angle of 150° again runs through the first intermediate voltage $U_{Z1}$ and the phase conductor is applied to a corresponding terminal of the d.c. power supply 9 during the time span $t_6$ (length 30°) symmetrical to this phase angle. Directly on the time span $t_6$ follows the time span $t_7$, which immediately precedes the zero transition of the sine wave leading to the negative half wave and the length of which amounts to only 15°. However, it is augmented by the immediately following time span $t_1$ of the negative half wave, which in turn displays a length of 15°, to a time interval, the length of which altogether corresponds to a phase angle of 30° and in the centre of which the ideal sine wave passes through the zero voltage, at which the phase conductor is held during this time interval $t_7+t_1$.

When no great demands are made on the quality of the staircase-shaped approximation of the actual voltage course to the ideal sinusoidal shape, the time spans $t_2$, $t_4$ and $t_6$ can immediately adjoin one the other in the case of a three-phase system, for which their time lengths and centre points are then displaced somewhat relative to the values given above.

For reduction of the power contained in the harmonic component, two further time spans $t_3$ and $t_5$ are preferably however provided between the time spans $t_2$ and $t_4$ or $t_4$ and $t_6$, during which the phase conductor is applied to a second intermediate voltage $U_{Z2}$, the value of which can for example amount to 75% of the crest voltage $U_S$ or, for a better approximation to the sine, 0.87% of the crest voltage. Both these further time spans $t_3$ and $t_5$, too, have a length of 30°.

Thereby, the positive half wave of the ideal sinusoidal course is thus completely covered by the seven time spans and it is exactly defined for each instant, at which voltage the phase conductor concerned has to lie. According to the invention, the control unit 14 produces the time spans $t_1$ to $t_7$ displaced one relative to the other for each phase conductor, but so that the switching operations, by which the phase conductors are applied to other output terminals of the d.c. power supply 9, take place at the same time.

In the same manner as was described for the positive half wave, the negative half wave following hereupon is covered by corresponding time spans $t_1$ to $t_7$, during which the phase conductor concerned is applied to voltages of the same amount, however of a sign opposite to that for the positive half wave. The time span $t_7$ of the negative half wave is then again followed by a time span $t_1$ of the next positive half wave.

Figure 4:
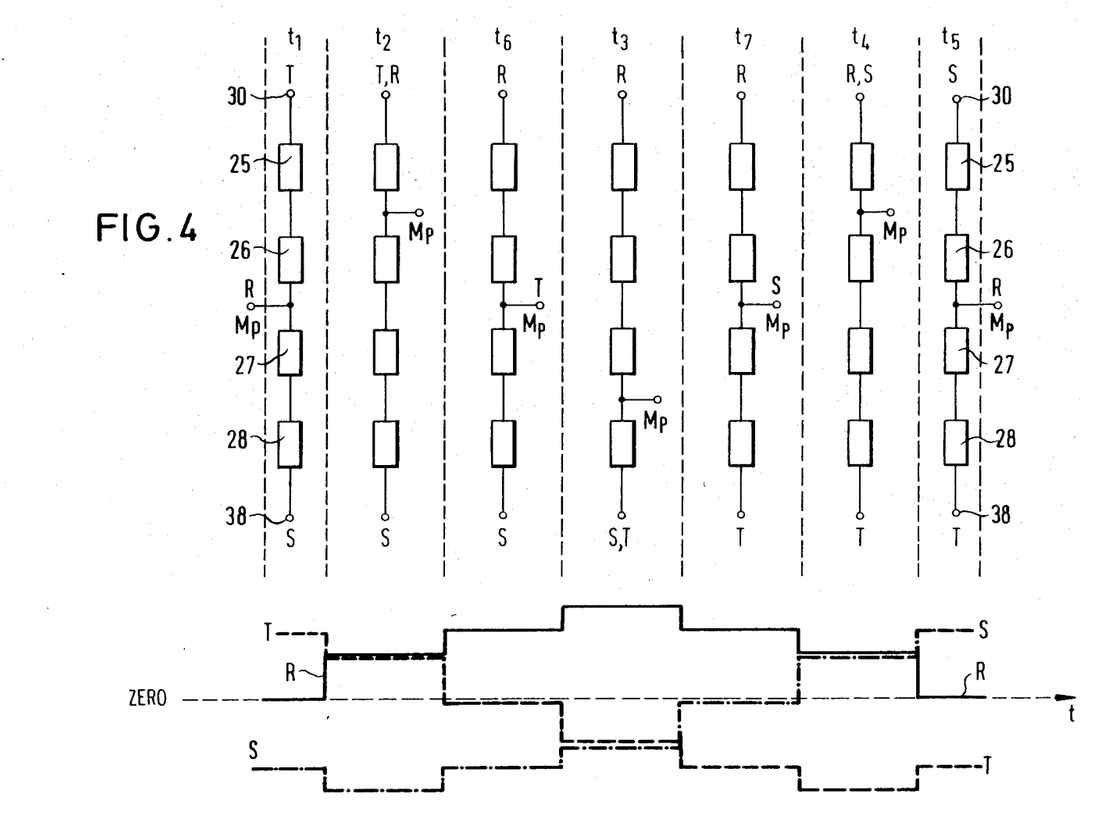

The series connection of the battery blocks 25, 26, 27 and 28 for the above-described time spans $t_1$ to $t_7$ is shown seven times in the upper region in FIG. 4, wherein it is indicated by the letters at the output terminals, with which of the phase conductors R, S and T to output terminal concerned stands in connection during the respective time span. In like manner, it is illustrated which output terminal is connected each time with the star point conductor Mp.

The staircase-shaped voltage course, resulting from these connections, of a positive half wave on the R-phase conductor is shown by continuous lines in the lower region of the FIG. 4. The designation of the time spans $t_1$ to $t_7$ is also referred to this positive half wave. Furthermore, also the simultaneously resulting voltage courses for the phase conductors S and T are illustrated, however in dashed or chain-dotted lines.

In the time span $t_1$, shown at the extreme left in FIG. 4, of the R-phase conductor, the star point conductor Mp lies at the centre point output terminal 34 of the d.c. power supply 9 and thus at zero voltage.

In the here illustrated, d.c. power supply the voltages of the battery blocks are so chosen that the voltages of both the upper battery blocks 25 and 26 just as the voltages of both the lower battery blocks 27 and 28 add up to the second intermediate voltage $U_2$, which here amounts to 75% of the crest voltage $U_{ZS}$.

Because of the phase displacement, amounting to 120°, between the phase conductors R, S and T, the T-phase conductor runs through a time span $t_5$ of a positive half wave and S-phase conductor runs through a time span $t_3$ of a negative half wave during the illustrated time span $t_1$ of a positive half wave of the R-phase conductor. Therefore, both these phase conductors are during the time span $t_1$ of the R-phase conductor connected with the positive end output terminal 30 or the lower end output terminal 38 of the d.c. power supply 9, which with respect to the zero voltage, at which the R-phase conductor and the star point conductor Mp lie, deliver the voltages $+U_{Z2}$ and $-U_{Z2}$, respectively.

The illustrated time span $t_1$ of the R-phase conductor is, as already mentioned, preceded by a time span $t_7$ of the preceding negative half wave. Since the R-phase conductor just as the star point conductor Mp was connected with the zero voltage already at the beginning of this time span $t_7$, no switching operation takes place during the transition from $t_7$ to $t_1$. This applies also for the phase conductors T and S, the time spans $t_5$ and $t_3$ of which are only half shown at the left in FIG. 4 and in reality are longer by 15° and lie symmetrically around the beginning of $t_1$.

The just described time span $t_1$ of the R-phase conductor is adjoined to the right in FIG. 4 by the time span $t_2$, during which the R-phase conductor must be applied to the first intermediate voltage $U_{Z1}$.

Since the d.c. power supply 9 is so built up that both the battery blocks 25 and 28 lying at the outer end in the series connection each deliver this intermediate voltage $U_{Z1}$, which here amounts to 50% of the crest voltage $U_S$, the R-phase conductor is applied to the positive end output terminal 30 for the time span $t_2$, whilst the star point conductor is applied to the positive intermediate output terminal 32, which is connected with the connection between the battery block 25 and the battery block 26. Thereby, also the R-phase conductor lies at the desired voltage $+U_{Z1}$ with respect to the star point conductor Mp.

During the time span $t_2$ of the R-phase conductor, the T-phase conductor runs through the time span $t_6$ of its positive half wave, in which it must be connected with the positive first intermediate voltage $+U_{Z1}$ and it can therefore likewise be connected with the positive end output terminal 30 of the series connection. As explained once again further below, this leads to the balancing, of the currents flowing in the phase conductors T and R when a phase displacement between current and voltage on each of these conductors is present by reason of an inductive or capacitive loading.

During the time span $t_2$ of the R-phase conductor, the S-phase conductor runs through the time span $t_4$ of its negative half wave, during which it must be applied to the negative crest voltage.

For this purpose, it is connected with the negative end output terminal 38 of the series connection, at which the negative crest voltage is present relative to the star point conductor Mp, since each of both the inner battery blocks 26 and 27 delivers a voltage which is equal to 25% of the crest voltage $U_S$.

The time span $t_2$ is followed by the time span $t_3$ of the R-phase conductor, during which it must be applied to the second intermediate voltage $U_{Z2}$. In order to attain this, the R-phase conductor remains connected with the positive end output terminal 30 of the series circuit and merely the star point conductor Mp is applied to the centre point output terminal 34 of the d.c. power supply 9 through actuation of the appropriate switches. Thereby, the sum voltage of the battery blocks 25 and 26, which as already mentioned amounts of 75% of the crest voltage $U_S$ and is thus equal to the second intermediate voltage $U_{Z2}$, drops across the R-phase conductor and the star point conductor Mp. During the time span $t_3$ of the R-phase conductor, the T-phase conductor at first runs through the time span $t_7$ of its positive half wave and then the time span $t_1$ of the negative half wave adjoining directly thereat. During this entire time interval, it is therefore connected with the centre point output terminal 34, which during this time delivers the zero voltage, of the d.c. power supply 9. At the same time, the S-phase conductor runs through the time span $t_5$ of its negative half wave, during which it must be held at $-U_{Z2}$. This occurs thereby, that it is in the time interval concerned connected with the negative end output terminal 38 of the series connection forming the d.c. power supply 9.

In the following time span $t_4$ of the R-phase conductor, this must display the positive crest voltage $U_S$. This is attained thereby, that it continues to remain connected with the positive end output terminal 30 of the series connection, while the star point conductor Mp is connected with the negative intermediate output terminal 37, which is connected with the connection between both the lower battery blocks 27 and 28. Thereby, the desired voltage $+U_S$ drops across Mp and R. At the same time, the T-phase conductor runs through the time span $t_2$ of its negative half wave, in which it must be connected with the negative first intermediate voltage $-U_{Z1}$. It is therefore switched to the negative end output terminal 38, which relative to the star point conductor just displays this first negative intermediate voltage, of the series connection. The S-phase conductor in this time runs through the time span $t_6$ of its negative half wave, in which it must likewise be connected with the negative first intermediate voltage $-U_{Z1}$. It can therefore likewise be applied to the negative end output terminal 38, whereby a reactive current compensation is in a given case again attained. p For both the next time spans $t_5$ and $t_6$ of the R-phase conductor, this remains connected with the positive end output terminal 30 and the staircase-shaped voltage drop required is attained thereby, that the star point conductor is applied during the time span $t_5$ to the centre point output terminal 34 and during the time span $t_6$ to the positive intermediate output terminal 32 between both the upper battery clocks 25 and 26. The S-phase conductor is likewise applied to the centre point output terminal 34 for the time span $t_5$ of the R-phase conductor, because it runs in this time interval through its time spans $t_7$ of the negative half wave and $t_1$ of the following positive half wave.

T-phase conductor remains at the negative end output terminal 38 of the d.c. power supply 9 for the time spans $t_5$ and $t_6$ of the R-phase conductor and it receives its negative voltages $-U_{Z2}$ and $-U_S$, respectively, by the star point conductor being displaced upwardly in the series connection.

In the time span $t_7$, shown at the extreme right in FIG. 4, of the R-phase conductor, this again lies together with the star point conductor Mp at the centre point output terminal 34 and thus at zero voltage in the required manner, whilst the S-phase conductor and the T-phase conductor remain at the upper positive and lower negative end output terminals 30 and 38, respectively, and thereby display the positive and negative first intermediate voltage $+U_{Z1}$ and $-U_{Z1}$, respectively.

The illustrated time span $t_7$ of the positive half wave of the R-phase conductor is then followed by a time span $t_1$ of the negative half wave, in which the R-phase conductor just as the star point conductor Mp remains at the centre point output terminal 34. No switching operations also take place for the S-phase conductor and the T-phase conductor during the transition to this next time span $t_1$. For the further adjoining time intervals, the same switching operations then take place as have just been described, only that the R-phase conductor wanders not upwardly, but downwardly at the series connection and the S-phase and the T-phase conductors are interchanged each with the other. The star point conductor Mp, too, goes first to the output terminal 37 instead of the output terminal 32. It thus continues the wave movement recognisable from FIG. 4 without phase step.

Figure 5:
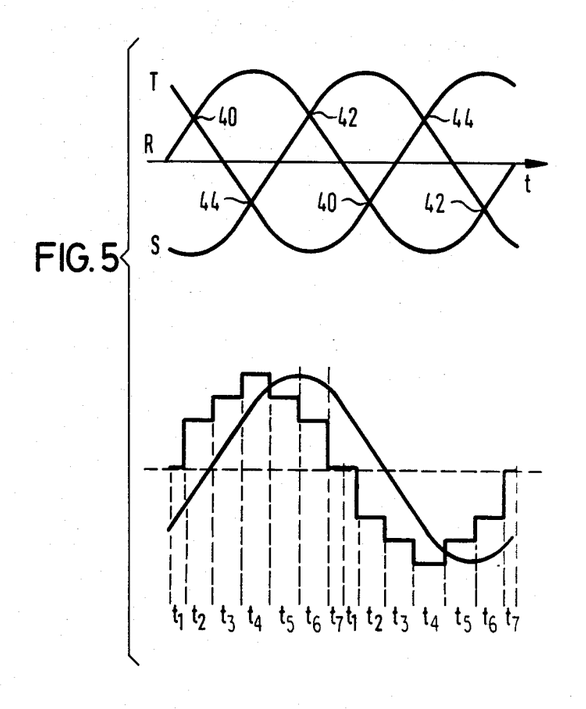

The ideal sinusoidal shapes for the three phase conductors R, S and T of a three-phase current system are shown once again in the upper part of the FIG. 5 to reduced time scale, wherein the R-phase conductor starts at the extreme left just as in FIG. 4 with a zero transition leading to the positive half wave. One infers from this illustration that the voltage course of the R-phase conductor for each half wave displays an intersection 40 with the voltage course of the T-phase conductor and an intersection 42 with the voltage course of the S-phase conductor. At these instants, both the phase conductors concerned thus have the same voltage including the sign and only the voltage gradient is different. This is utilised according to the invention to connect both phase conductors during corresponding time spans, which surround the instant of this mutual intersection, with the same output terminal of the d.c. power supply. This applies correspondingly for the positive as well as also the negative half waves and for the intersections 44 of the voltage courses on the S-phase conductor and the T-phase conductor.

Represented synchronously with the voltage course of the R-phase conductor in the lower part of the FIG. 5 is the staircase-shaped voltage course as produced on this phase conductor by the above-described switching operations. At the same time, the current course on the R-phase conductor is drawn sinusoidally in the lower part of FIG. 5, wherein a lead by 45° was assumed. One sees that the current on the R-phase conductor still possesses negative values during the time span $t_1$, although the voltage is zero. The same applies for the time span $t_7$ of the preceding negative half wave of the R-phase conductor, not illustrated in FIG. 5 and preceding the time span $t_1$. This time intervall $t_7+t_1$ is however with the zero potential and thus no danger exists that a charging current flows into the batteries. Thereagainst, the voltage is positive in the time span $t_2$ following the time span $t_1$, whilst the current is still negative. Here, it would thus come to the occurrence of a charging current without the measures according to the invention. Since now according to the invention, however, the R-phase conductor does not on its own, but together with the T-phase conductor lie at the concerned output terminal of the d.c. power supply 9 and the T-phase conductor at the considered instant just runs through the time span $t_6$, not only the current of the R-phase conductor, but the difference current of the currents of the R-phase and the T-phase conductors flows at this output terminal. As is evident from FIG. 5, the current leading by 45° just passes through its positive maximum during the time span $t_6$. Although this is illustrated in FIG. 5 for the R-phase conductor, the same however also applies for the T-phase conductor. Thereby, during the time, in which the R-phase conductor and the T-phase conductor together lie at the same output terminal of the d.c. power supply 9, the positive current of the T-phase conductor is greater in amount than the negative current of the R-phase conductor so that the difference current remains positive and possesses the same sign as the voltage which is positive in this time interval. Thereby, the d.c. power supply 9 is not loaded by a countercurrent or a charging current during the time interval $t_2$. Since the same applies also for the time span $t_6$ of the positive half waves and the time spans $t_2$ and $t_6$ of the negative half waves, a time interval $t_6+t_7+t_1+t_2$ is created around every zero transition of the ideal sine curve, in which interval a phase lead or lag of the current relative to the voltage can not exert any damaging influence on the voltage source arrangement. Thus, phase displacements of that kind can be permitted within this time interval. The maximum permissible phase displacement between current and voltage is determined by the length of this time interval which in the above-described examples corresponds to a phase angle of 90°, so that phase displacements of ±45° can be permitted.

Figure 6:
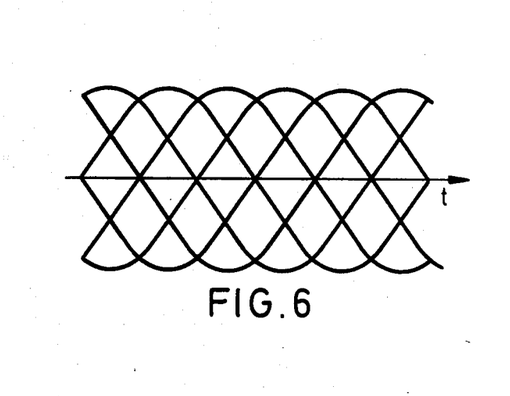

The idealised voltage courses of a six-phase current system are reproduced in FIG. 6. One sees that the voltage of each phase conductor here displays four intersections per half wave with the voltage courses of other phase conductors. The above-described method of the reactive current compensation thus lets itself be applied not only twice, but four times for each half wave thereby, that two phase conductors are each time applied to a common output terminal of a direct voltage source arrangement during the time spans $t_3$ and $t_5$. Thereby, the safety time interval arising around each zero transition increases to nearly double so that phase displacements up to ±75% can be permitted.

Figure 7:
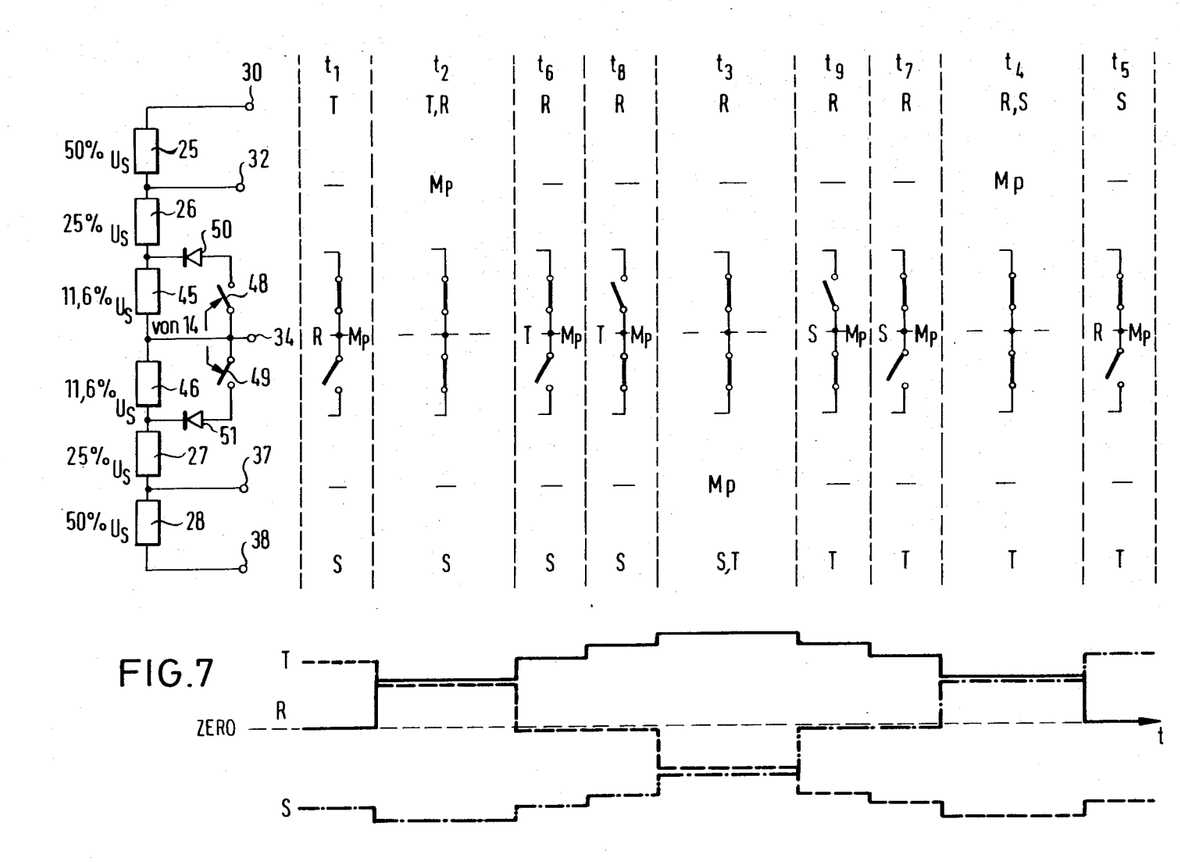

FIG. 7 shows an illustration, similar to that of FIG. 4, for a modified direct voltage source arrangement which is here however represented only once, while the terminal occupancies as well as the settings of the switches 48 and 49 additionally coming into use here are represented in the column for the time spans $t_1$ to $t_9$ at a somewhat extended time scale.

The lower region of the FIG. 7 again shows the voltage course attainable in this manner on the three phase conductors R, S and T of a three-phase system.

The d.c. power supply of the FIG. 7 differs from that in FIG. 4 in that two further battery blocks 45 and 46 are inserted symmetrically to the centre point of the arrangement between both the inner battery blocks 26 and 27. According to one principle of the invention, the voltages of the different battery blocks are also here so chosen that the battery blocks 25 and 28, which lie outwardly towards the ends of the series connection, each deliver the highest voltage which is equal to $U_{Z1}$ and here amounts to 50% of the crest voltage $U_S$. Adjoining inwardly thereat are both the battery blocks 26 and 27, which deliver 25% of the crest voltage $U_S$ and the voltage of which, on addition to the voltage of the battery blocks 25 and 28, results in the second intermediate voltage $U_{Z2}$. Both the innermost battery blocks 45 and 46 here possess a voltage which is equal to 11.6% of the crest voltage $U_S$ and, on addition to both the other voltage, results in a third intermediate voltage $U_{Z3}$.

This arrangement serves to introduce a further staircase step in the region, which surrounds the crest voltage and in which the sine function extends relatively flatly, and thereby to attain a smoother approximation to the ideal sinusoidal course. For this purpose, each half sine wave is spanned not be seven, but by nine time spans $t_1$ to $t_9$, wherein both the additional time spans $t_8$ and $t_9$ are inserted between the already described time spans $t_3$ and $t_4$ or $t_4$ and $t_5$. The time spans $t_3$ and $t_5$ are halved for this purpose so that they now only correspond to a phase angle of 15°.

However, an invariable series connection of all units 25, 26, 45, 46, 27 and 28 can no longer be maintained in this arrangement. Rather, it is necessary to switch both the inner units 45 and 46 into and out of the series connection. For this purpose, each of both these units 45 and 46 can be short-circuited in terms of voltage by a controllable switch 48 and 49 lying parallel to it. In order to avoid the flowing of a high short-circuit current, appropriately poled diodes 50 and 51 are connected in series with the switches 48 and 49.

Since the terminal occupancy for the phase conductors R, S and T as well as for the star point conductor Mp is the same as in the example of embodiment illustrated in FIG. 4, a repeated description can be dispensed with. In the following, merely the switching states of the controllable switches 48 and 49 during the individual time spans $t_1$ and so forth are described.

Illustrated at the left in FIG. 7 is again the time span $t_1$, during which the R-phase conductor lies at zero potential and therefore is just as the star point conductor Mp connected with the centre output terminal 34. The phase conductor T during this time interval runs through its time span $t_5$ and must therefore lie at 75% of the crest voltage $U_S$. It is connected with the positive end output terminal 30, which relative to the star point conductor Mp however would deliver 86.6% of the crest voltage $U_S$, if the controllable switch 48 were not closed. Since this switch is however closed, the desired voltage lies at T.

The phase conductor S in this time interval runs through the time span $t_8$, in which it is desired to apply a voltage to it, which is greater than 75% of $U_S$, because this time span immediately precedes the passage through the crest voltage $U_S$. The phase conductor S is connected with the negative end output terminal 38 of the series connection during the time span $t_1$ of the phase conductor R and, since the switch 49 is opened in this time span, the sum of the voltages of the units 46, 27 and 28 is present at this end output terminal 38, i.e. 86.6% of the crest voltage $U_S$, which corresponds to the actual sine value at a phase angle of 60°.

In the following time span $t_2$, the phase conductors T and R lie at the positive end output terminal 30 and possess the desired voltage of 50% of the crest voltage $U_S$ relative to the star point conductor Mp applied to the positive intermediate output terminal 32. The phase conductor S shall in this time span $t_2$ run through its negative maximum, i.e. possess the negative crest voltage $-U_S$ relative to the star point conductor Mp. In order to attain this, both inner battery blocks 45 and 46 are short-circuited through closing of the switches 48 and 49, i.e. switched out of the series connection. In the following time span $t_3$, the phase conductor R remaining at the positive end output terminal 30 shall possess a voltage, which is equal to 75% of $U_S$, relative to the star point conductor Mp applied to the centre point terminal 34. Therefore, the upper switch 48 is closed in order to short-circuit the battery block 45. The phase conductor S, which continues to be connected with the negative end output terminal 38, during this time interval runs through its time span $t_9$, during which it shall lie at the third intermediate voltage $U_{Z3}$. Therefore, the lower switch 49 is opened so that the sum voltage of all three lower battery blocks 46, 27 and 28 drops across between the phase conductor S and the star point conductor Mp. During the following time span $t_8$, the R-phase conductor shall then be applied to the third intermediate voltage $U_{Z3}$. It therefore remains at the positive end output terminal 30 and the upper switch 48 is opened so that the desired voltage results relative to the star point conductor Mp remaining at the centre point terminal 34. The S-phase conductor in this time interval runs through its time span $t_5$, in which it shall be applied to the second intermediate voltage $U_{Z2}$. For this, it remains connected with the negative end output terminal 38 and merely the switch 49 is closed so that the the voltage of the battery block 46 is no longer added to that of the battery blocks 27 and 28.

In the following time span $t_4$ of the R-phase conductor, both the switches 48 and 49 are closed, since the required voltages are delivered by their four outer battery blocks 25, 26, 27 and 28. The upper switch 48 is opened for the time span $t_9$ in order to apply the R-phase conductor to the third intermediate voltage $U_{Z3}$. The switch 48 is closed in the time span $t_5$, since the R-phase conductor must be applied to the second intermediate voltage $U_{Z2}$. At the same time, the switch 49 is opened in order to apply the T-phase conductor to the negative third intermediate voltage $-U_{Z3}$. Both the switches 48 and 49 are closed during the time span $t_6$ of the R-phase conductor, because the required voltages are delivered by the four outer battery blocks 25, 26, 27 and 28. Finally, the switch 48 is closed and the switch 49 opened in the time span $t_7$ of the R-phase conductor in order to give the correct voltages to the phase conductors S and T, which at these instants lie at the end output terminals 30 and 38, respectively.

By this embodiment, an additional graduation of the staircase-shaped voltage is thus attained on each of the three phase conductors in the region, in which also the sinusoid to be approximated possesses a comparatively flat course. However, the aimed-at uniform current loading of the battery blocks is now attained only for the four outer battery blocks 25, 26, 27 and 28, whilst both inner battery blocks 45 and 46 must be fully switched in or out for certain times.

In dependence on the requirements of a concrete case of application, it can here thus be optimised between improved approximation to the ideal sinusoidal shape or as uniform as possible a current loading of the direct voltage sources. Within the scope of the invention, also still further intermediate voltages can be introduced for this purpose, which are applied to the phase conductors during additional time spans t.

In conclusion, it is pointed out once again that an inverter according to the invention can be used not only as emergency current unit, but also as independent current and voltage source wherever an appropriate multiphase mains network does not stand at disposal for a load.

I claim:

1. Inverter for generating, on each of the phase conductors of a multiphase system, a staircase-shaped voltage approximating an a.c. voltage which sinusoidally and periodically increases from a zero voltage to a positive crest voltage, decreases therefrom through said zero voltage to a negative crest voltage and increases again therefrom to said zero voltage, the staircase-shaped voltages on the different phase conductors having a phase shift with respect to each other the value of which is equal to 360° electr. divided by the number of phase conductors in said multiphase system, wherein said inverter comprises a d.c. power supply having
  an even number of d.c. voltage source units which are connected in series with same polarities and
  several output terminals being connected to said d.c. voltage source units so that there is one center point output terminal and one positive and one negative end output terminal which are electrically symmetrical to said center point output terminal, whereby the voltage between the one end output terminal and the center point output terminal has the same value but the opposite sign as the voltage between the other end output terminal and the center point output terminal, the voltage values of the d.c. voltage source units being chosen so that at said output terminals of said d.c. power supply at least the following d.c. voltages are available: one positive and one negative crest voltage the value of which corresponds to the crest voltage of the a.c. voltage to be approximated, one positive and one negative first intermediate voltage, having the same absolute value which is above zero and below the absolute value of the crest voltage, and one positive and one negative second intermediate voltage having the same absolute value which is above the absolute value of said first intermediate voltage and below the absolute value of the crest voltage, said inverter further comprising
  at least three groups of controllable switches each of which switches has a first and a second connection terminal and is switchable to an fro between a closed status, in which it establishes an electrically conducting connection between said first and second connection terminals, and an open status, in which it interrupts the electrically conducting connection between said first and second connection terminals, each of said at least three groups of switches comprising a number of switches which is equal to the number of phase conductors in said multiphase system, each of said first connection terminals of the switches of each group being connected to a respective one of said phase conductors, the second connection terminal of the switches of a first one of said at least three groups being commonly connected to said positive end output terminal, the second connection terminals of the switches of a second one of said at least three groups being commonly connected to said centre point output terminal, and the second connection terminals of the switches of a third one of said at least three groups being commonly connected to said negative end output terminal, and a control means by which said switches are controllable so that, for the staircase-shaped approximation of each voltage half wave of the sinusoidal a.c. voltage, each of said phase conductors is connectable.

for a first time span $t_1$ to an output terminal of said d.c. power supply providing said zero voltage, for a second time span $t_2$ following immediately thereon to an output terminal of said d.c. power supply providing the one of said two first intermediate voltages having the same sign as the voltage half wave to be approximated, for a third time span $t_3$ following immediately thereon to an output terminal of said d.c. power supply providing the one of said two second intermediate voltages having the same sign as the voltage half wave to be approximated, for a fourth time span $t_4$ following immediately thereon to an output terminal of said d.c. power supply providing the one of said two crest voltages having the same sign as the voltage half wave to be approximated, for a fifth time span $t_5$ following immediately thereon to an output terminal of said d.c. power supply providing the same second intermediate voltage as used during said third time span $t_3$, for a sixth time span $t_6$ following immediately thereon to an output terminal of said d.c. power supply providing the same first intermediate voltage as used during said second time span $t_2$, and for a seventh time span $t_7$ following immediately thereon to an output terminal of said d.c. power supply providing said zero voltage, this sequence being repeated with alternating voltage sign at double the frequency of the multiphase voltage to be approximated.

2. Inverter according to claim 1, wherein said d.c. power supply comprises an outer negative d.c. voltage source unit the negative terminal of which is connected to said negative end output terminal of said d.c. power supply, an inner negative d.c. voltage source unit the negative terminal of which is connected to the positive terminal of said outer negative d.c. voltage source unit and to a negative intermediate output terminal of said d.c. power supply, an inner positive d.c. voltage source unit the negative terminal of which is connected to the positive terminal of said inner negative d.c. voltage source unit and to said center point output terminal of said d.c. power supply, and an outer positive d.c. voltage source unit the negative terminal of which is connected to the positive terminal of said inner positive d.c. voltage source unit and to a positive intermediate output terminal of said d.c. power supply, and the positive terminal of which is connected to said positive end output terminal of said d.c. power supply, wherein each of the voltages provided by said outer negative and said outer positive d.c. voltage source units is equal to said first intermediate voltage and each of the voltages provided by said inner negative and said inner positive d.c. voltage source units is equal to the difference between said first and said second intermediate voltages, and wherein each of the phase conductors is connectable by means of said controllable switches alternately to said positive or said negative end output terminal or to said center point output terminal of said d.c. power supply.

3. Inverter according to claim 2 for a three-phase current system having three phase conductors wherein for any positive voltage half wave on a first one of said three phase conductors during said first time span $t_1$ said first phase conductor remains connected to said center point output terminal whereas a second one of said three phase conductors remains connected to said negative end output terminal and the third phase conductor remains connected to said positive end output terminal, during said second time span $t_2$ said first phase conductor is and said third phase conductor remains connected to said positive end output terminal whereas said second phase conductor remains connected to said negative end output terminal, during said third time span $t_3$ said first phase conductor remains connected to said positive end output terminal whereas said second phase conductor remains connected to said negative end output terminal, and said third phase conductor is connected to said center point output terminal, during said fourth time span $t_4$ said first phase conductor remains connected to said positive end output terminal whereas said second phase conductor remains and said third phase conductor is connected to said negative end output terminal, during said fifth time span $t_5$ said first phase conductor remains connected to said positive end output terminal whereas said second phase conductor is connected to said center point output terminal and said third phase conductor remains connected to said negative end output terminal during said sixth time span $t_6$ said first phase conductor remains and said second phase conductor is connected to said positive end output terminal whereas said third phase conductor remains connected to said negative end output terminal, and during said seventh time span $t_7$ said first phase conductor is connected to said center point output terminal whereas said second phase conductor remains connected to said positive end output terminal and said third phase conductor remains connected to said negative end output terminal, and wherein for any negative voltage half wave on said first phase conductor during the corresponding time spans all these conductors are connected either to the center point output terminal in the same way as for the positive voltage half waves or are or remain connected to the corresponding end output terminals having the opposite sign than the end output terminals to which said phase conductors are or remain connected for the positive voltage half waves.

4. Inverter according to claim 3 for a three-phase current system additionally comprising a star point conductor, wherein controllable switches are provided by means of which said star point conductor is alternately connectable to said center point output terminal and said positive or said negative intermediate output terminals, wherein for any positive voltage half wave on said first phase conductor said star point conductor is connected during said first time span $t_1$ to said center point output terminal, during said second time span $t_2$ to said positive intermediate output terminal, during said third time span $t_3$ to said center point output terminal, during said fourth time span $t_4$ to said negative intermediate output terminal, during said fifth time span $t_5$ to said center point output terminal, during said sixth time span $t_6$ to said positive intermediate output terminal, and during said seventh time span $t_7$ to said center point output terminal, and wherein for any negative voltage half wave on said first phase conductor during the corresponding time spans said star point conductor is connected to the center point output terminal in the same way as for the positive voltage half waves or to the intermediate output terminal having the opposite sign than the intermediate output terminal to which said star point conductor is connected for the positive voltage half waves.

5. Inverter according to any one of claims 1 to 4, wherein said d.c. voltage source units are battery blocks.

6. Inverter according to any one of claims 1 to 4, wherein each of said first and said seventh time spans $t_1$ and $t_7$ corresponds to a phase angle of between 10° electr. and 20° electr. and each of all other time spans $t_2$ to $t_6$ corresponds to a phase angle of between 25° electr. and 35° electr.

7. Inverter according to any one of claims 1 to 4, wherein each of said first and said seventh time spans $t_1$ and $t_7$ corresponds to a phase angle of 15° electr. and each of all other time spans $t_2$ to $t_6$ corresponds to a phase angle of 30° electr.

8. Inverter according to any one of claims 1 to 4, wherein the first intermediate voltage amounts to between 40% and 60% of the crest voltage and wherein the second intermediate voltage amounts to between 60% and 95% of the crest voltage.

9. Inverter according to any one of claims 1 to 4, wherein the first intermediate voltage amounts to 50% of the crest voltage and wherein the second intermediate voltage amounts to 75% of the crest voltage.

10. Inverter for generating, on each of the phase conductors of a multiphase system, a staircase-shaped voltage approximating an a.c. voltage which sinusoidally and periodically increases from a zero voltage to a positive crest voltage, decreases therefrom through said zero voltage to a negative crest voltage and increases again therefrom to said zero voltage, the staircase-shaped voltages on the different phase conductors having a phase shift with respect to each other the value of which is equal to 360° electr. divided by the number of phase conductors in said multiphase system, wherein said inverter comprises a.d.c. power supply having
 an outer negative d.c. voltage source unit the negative terminal of which is connected to a negative end output terminal of said d.c. power supply,
 an inner negative d.c. voltage source unit the negative terminal of which is connected to the positive terminal of said outer negative d.c. voltage source unit and to a negative intermediate output terminal of said d.c. power supply,
 an inner positive d.c. voltage source unit the negative terminal of which is connected to the positive terminal of said inner negative d.c. voltage source unit and to a center point output terminal of said d.c. power supply, and
 an outer positive d.c. voltage source unit the negative terminal of which is connected to the positive terminal of said inner positive d.c. voltage source unit and to a positive intermediate output terminal of said d.c. power supply, and
 the positive terminal of which is connected to a positive end output terminal of said d.c. power supply, the voltage values of the d.c. voltage source units being chosen so that at the output terminals of said d.c. power supply at least the following d.c. voltages are available:
one positive and one negative crest voltage the value of which corresponds to the crest voltage of the a.c. voltage to be approximated,
one positive and one negative first intermediate voltage, having the same absolute value which is above zero and below the absolute value of the crest voltage, and
one positive and one negative second intermediate voltage having the same absolute value which is above the absolute value of said first intermediate voltage and below the absolute value of the crest voltage, wherein each of the voltages provided by said outer negative and said outer positive d.c. voltage source units is equal to said first intermediate voltage and each of the voltages provided by said inner negative and said inner positive d.c. voltage source units is equal to the difference between said first and said second intermediate voltages, said inverter further comprising
 a series of controllable switches each of which has two connection terminals and is switchable to and fro between a closed status, in which it establishes an electrically conducting connection between its connection terminals, and an open status, in which it interrupts the electrically conducting connection between its connection terminals, the one of said two connection terminals of each switch being electrically connected to one of said output terminals of said d.c. power supply and the other one of said two connection terminals of each switch being connected to one of said phase conductors, and
 a control means by which said switches are controlable so that, for the staircase-shaped approximation of each voltage half wave of the sinusoidal a.c. voltage, each of said phase conductors is connectable
 for a first time span $t_1$ to said centre point output terminal of said d.c. power supply providing said zero voltage,
 for a second time span $t_2$ following immediately thereon to an output terminal of said d.c. power supply providing the one of said two first intermediate voltages having the same sign as the voltage half wave to be approximated,
 for a third time span $t_3$ following immediately thereon to an output terminal of said d.c. power supply providing the one of said two second intermediate voltages having the same sign as the voltage half wave to be approximated,
 for a fourth time span $t_4$ following immediately thereon to an output terminal of said d.c. power supply providing the one of said two crest voltages having the same sign as the voltage half wave to be approximated,
 for a fifth time span $t_5$ following immediately thereon to an output terminal of said d.c. power supply providing the same second intermediate voltage as used during said third time span $t_3$, for a sixth time span $t_6$ following immediately thereon to an output terminal of said d.c. power supply providing the same first intermediate voltage as used during said second time span $t_2$, and for a seventh time span $t_7$ following immediately thereon again to said centre point output terminal of said d.c. power supply providing said zero voltage, this sequence being repeated with alternating voltage sign at double the frequency of the multiphase voltage to be approximated.

11. Inverter according to claim 10 for a three-phase current system having three phase conductors wherein for any positive voltage half wave on a first one of said three phase conductors during said first time span $t_1$ said first phase conductor remains connected to said center point output terminal whereas a second one of said three phase conductors remains connected to said negative end output terminal and the third phase conductor remains connected to said positive end output terminal, during said second time span $t_2$ said first phase conductor is and said third phase conductor remains connected to said positive end output terminal whereas said second phase conductor remains connected to said negative end output terminal, during said third time span $t_3$ said first phase conductor remains connected to said positive end output terminal whereas said second phase conductor remains connected to said negative end output terminal, and said third phase conductor is connected to said center point output terminal, during said fourth time span $t_4$ said first phase conductor remains connected to said positive end output terminal whereas said second phase conductor remains and said third phase conductor is connected to said negative end output terminal, during said fifth time span $t_5$ said first phase conductor remains connected to said positive end output terminal whereas said second phase conductor is connected to said center point output terminal and said third phase conductor remains connected to said negative end output terminal during said sixth time span $t_6$ said first phase conductor remains and said second phase conductor is connected to said positive end output terminal whereas said third phase conductor remains connected to said negative end output terminal, and during said seventh time span $t_7$ said first phase conductor is connected to said center point output terminal whereas said second phase conductor remains connected to said positive end output terminal and said third phase conductor remains connected to said negative end output terminal, and wherein for any negative voltage half wave on said first phase conductor during the corresponding time spans all these conductors are connected either to the center point output terminal in the same way as for the positive voltage half waves or are or remain connected to the corresponding end output terminals having the opposite sign than the end output terminals to which said phase conductors are or remain connected for the positive voltage half waves.

12. Inverter according to claim 11 for a three-phase current system additionally comprising a star point conductor, wherein controllable switches are provided by means of which said star point conductor is alternately connectable to said center point output terminal and said positive or said negative intermediate output terminals, wherein for any positive voltage half wave on said first phase conductor said star point conductor is connected during said first time span $t_1$ to said center point output terminal, during said second time span $t_2$ to said positive intermediate output terminal, during said third time span $t_3$ to said center point output terminal, during said fourth time span $t_4$ to said negative intermediate output terminal, during said fifth time span $t_5$ to said center point output terminal, during said sixth time span $t_6$ to said positive intermediate output terminal, and during said seventh time span $t_7$ to said center point output terminal, and wherein for any negative voltage half wave on said first phase conductor during the corresponding time spans said star point conductor is connected to the center point output terminal in the same way as for the positive voltage half waves or to the intermediate output terminal having the opposite sign than the intermediate output terminal to which said star point conductor is connected for the positive voltage half waves.

13. Inverter according to any one of claims 10 to 12, wherein said d.c. voltage source units are battery blocks.

14. Inverter according to any one of claims 10 to 12, wherein each of said first and said seventh time spans $t_1$ and $t_7$ corresponds to a phase angle of between 10° electr. and 20° electr. and each of all other time spans $t_2$ to $t_6$ corresponds to a phase angle of between 25° electr. and 35° electr.

15. Inverter according to any one of claims 10 to 12, wherein each of said first and said seventh time spans $t_1$ and $t_7$ corresponds to a phase angle of 15° electr. and each of all other time spans $t_2$ to $t_6$ corresponds to a phase angle of 30° electr.

16. Inverter according to any one of claims 10 to 12, wherein the first intermediate voltage amounts to between 40% and 60% of the crest voltage and wherein the second intermediate voltage amounts to between 60% and 95% of the crest voltage.

17. Inverter according to any one of claims 10 to 12, wherein the first intermediate voltage amounts to 50% of the crest voltage and wherein the second intermediate voltage amounts to 75% of the crest voltage.

* * * * *